United States Patent Office 3,083,542
Patented Apr. 2, 1963

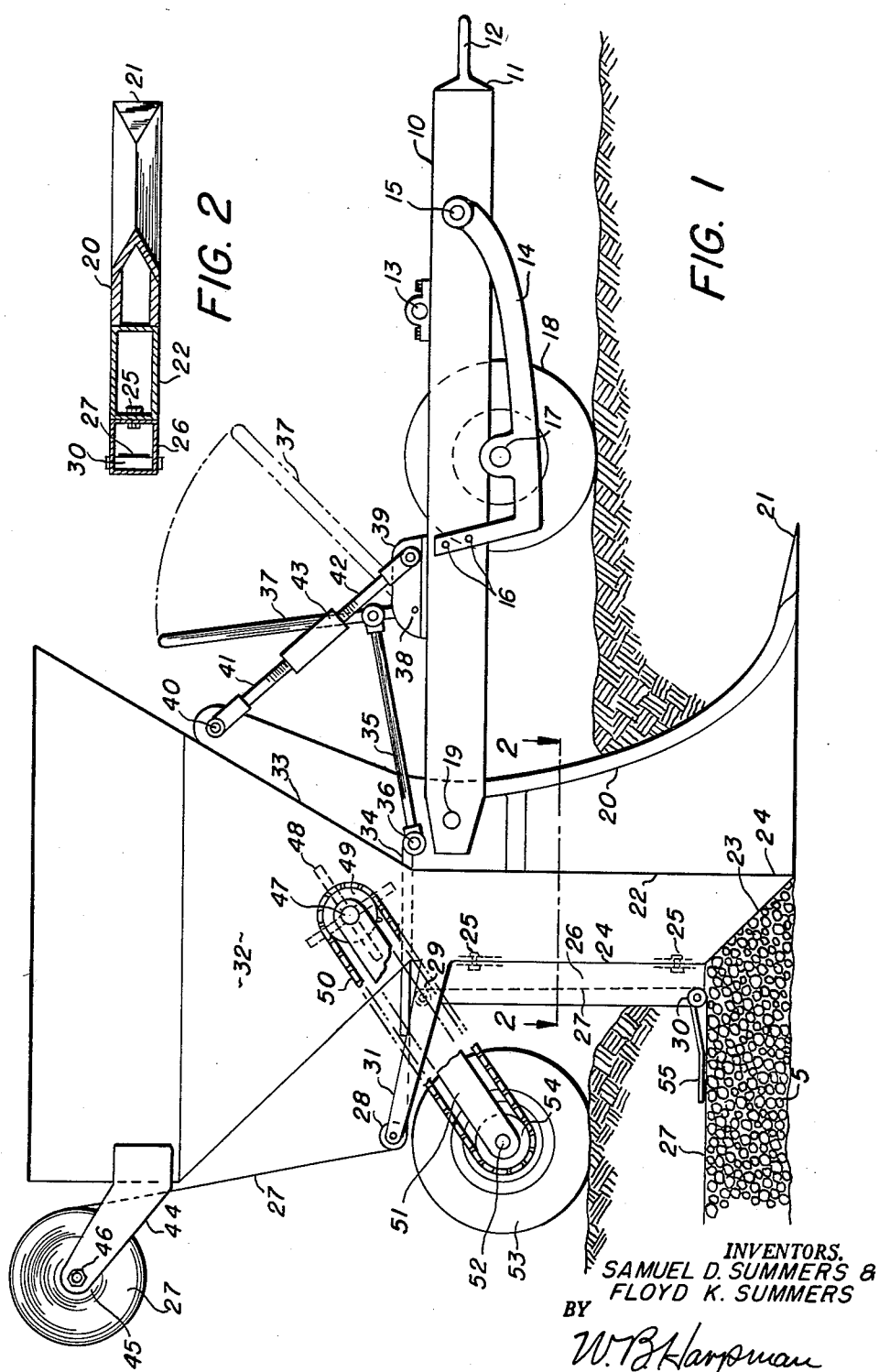

3,083,542
DEVICE FOR INSTALLING SOIL DRAINAGE MEANS
Samuel D. Summers, Rte. 1, Fowler, Ohio, and Floyd K. Summers, Rte. 1, Farmdale, Ohio
Filed Dec. 21, 1959, Ser. No. 860,981
2 Claims. (Cl. 61—72.1)

This invention relates to a device for installing a layer of slag, gravel, crushed rock or the like in the soil in a field below plow depth so that said layer of slag, gravel, or crushed rock acts as a passageway for water and as a means of aerating the soil thereabout.

The principal object of the invention is a provision of a device for simultaneously digging a trench, installing a course of slag, gravel or crushed rock therein, covering the slag, gravel, or crushed rock with water impervious sheet material and closing the trench thereover.

A further object of the invention is the provision of a device for placing a layer of granular material in the earth below the surface thereof.

A further object of the invention is the provision of a device for installing a simple and inexpensive subsoil drainage means through the positioning of relatively thick layers of slag, gravel, crushed rock or the like in continuous rows beneath the surface of a field or the like.

A still further object of the invention is the provision of a device for installing a "French Drain" including means for covering the French Drain for preventing filling of the French Drain by soil moving downwardly thereto.

The device for positioning slag, gravel, crushed rock or the like or agricultural chemicals and the like as disclosed herein is particularly adapted for the economical formation of subsoil drainage means in fields such as those in which various crops are grown. Those skilled in the art will recognize that it has long been customary to tile fields for drainage purposes and that such tiling is relatively expensive and has in some instances had the effect of draining away the moisture too rapidly and thereby resulting in a lack of moisture in the soil and at the same time increases the likelihood of flood damage due to the increased runoff from fields so tiled.

The present invention relates to a device which may be conveniently and inexpensively used for placing layers of slag, gravel, or crushed rock or the like of desired thickness at a desirable depth beneath the surface of a field or other area so that the field may be plowed over the subsoil drain thus formed. Those skilled in the art will appreciate that the formation of such subsoil drains have numerous advantages over the tiles heretofore used in that drainage is effected at a minimum of expense, labor and time. The positioning of the slag, gravel, or crushed rock or similar material beneath plow depth in a field in a drainage plan system has the further advantage of providing for the aeration of the soil while at the same time providing a readily accessible moisture channel in which the roots of the crops and the like may penetrate. As a result of the use of such subsoil drainage systems as may be installed with the device disclosed herein increased crop production is realized and a generally improved soil condition results.

The present invention includes means for positioning the gravel, slag or crushed rock in rows of desired depth and thickness and simultaneously providing a covering strip of water impervious paper, plastic or the like such as polyethylene film for example, which prevents the filling up of the slag, gravel or crushed rock course by the soil and at the same time slows down the drainage rate while yet providing adequate subsoil drainage and aeration.

The device disclosed herein includes a hopper, a chisel-type hollow blade including means for conveying slag, gravel, or crushed rock from the hopper to the bottom of the trench dug by the chisel-like blade and a section for feeding the paper or plastic film strip into proper position longitudinally of the trench and immediately on top of the slag, gravel or crushed rock positioned therein. Those skilled in the art will recognize that trenches dug by chisel-type blades are deep and narrow so that the present device may be pulled across a field by a tractor while continuously digging a trench, depositing the slag, gravel or crushed rock therein and covering the same with the strip of treated paper or plastic film.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a side elevation of the slag depositing device with parts broken away and illustrating the same in use with portions of the device in subsoil position.

FIGURE 2 is a horizontal section on line 2—2 of FIGURE 1.

By referring to the drawing and FIGURE 1 in particular, it will be seen that the device comprises a pair of longitudinally extending transversely spaced arms 10 joined at their front ends by a frame member 11 which includes a hitch 12, by which the frame member 11 may be connected to a tractor and towed thereby. The arms 10 carry a cross shaft 13 which projects transversely from either side thereof and is adapted to be engaged by the hydraulic lift means of a conventional tractor (not shown) so that the arms 10 may be elevated thereby. An arcuate arm 14 has one end pivoted to the arms 10 by pivot 15 and its other end secured to one of the arms 10 by fasteners 16 and intermediate the pivot 15 and the fasteners 16 there is an axle 17 carrying a colter 18.

The rearmost ends of the arms 10 carry a transversely mounted pivot 19 which engages the upper middle portion of a chisel-type plow blade 20 the lower portion of which curves outwardly and downwardly and terminates in a flat point 21. A horizontal section through the plow blade 20 may be seen in FIGURE 2 of the drawings and it will be observed that it is of the same width as a vertically positioned cross sectionally rectangular material delivery tube 22 which is secured to the vertical back wall of the blade 20 and forms a structural portion thereof. The delivery tube 22 has its lower end 23 formed on a diagonal plane with the front wall 24 of the delivery tube 22 terminating on the level of the bottom of the blade 20 while the rearmost wall 24 of the delivery tube 22 terminates substantially thereabove. Thus materials such as slag, gravel, crushed rock and the like positioned in the upper end of the delivery tube 22 will be delivered through the diagonal opening in the lower end 23 thereof when the device is moved forwardly through the earth as shown in FIGURE 1 of the drawings.

Bolts 25 are positioned through the back wall 24 of the delivery tube 22 and adjustably mount a secondary delivery tube 26 so that it can be moved vertically relative to the delivery tube 22 and thus act as a gate with respect to the diagonally positioned open lower end 23 of the delivery tube 22.

As illustrated in FIGURE 1 of the drawings, the secondary delivery tube 26 is shown in maximum elevated position and slots in its forward wall, through which the bolts 25 are positioned, permit it to be moved to a desirable position where it may be secured by tightening said bolts 25. The secondary delivery tube 26 is provided to form a passage-way for a continuous strip of cellulose film, polyethylene film or treated paper 27 which is threaded over rollers 28, 29 and 30. The rollers 29 and 30 are positioned in the upper and lower ends of the secondary delivery tube 26 and the roller 28 is positioned rearwardly thereof on the end of a bracket 31 which is attached to the upper end of the delivery tube 22.

A hopper 32 including front, rear and side walls is positioned on the upper end of the delivery tube 24 and secured to an upper extension 33 of the blade 20. The hopper 32 provides a receptacle for a supply of slag, crushed rock or gravel which is positioned therein and fed downwardly through the delivery tube 22. A horizontal gate valve 34 is positioned in the bottom of the hopper 32 and is adapted to be moved to open or close position by a rod 35 which is pivoted thereto by a pivot pin 36 and also pivoted to an operating lever 37. The operating lever 37 is pivoted by a pin 38 to a bracket 39 which is positioned on the arms 10 heretofore referred to. An adjustment device is pivotally positioned between a pivot pin 40 in the uppermost portion of the extension 33 of the blade 20 and a bracket 39 on the arms 10 and includes a pair of oppositely threaded rods 41 and 42 having a threaded coupling 43 engaged thereon. As will be understood by those skilled in the art rotation of the threaded coupling 43 will move the rods 41 and 42 toward or away from one another thereby tilting the blade 20 and its extension 33 and simultaneously tilting the delivery tube 22 and the hopper 32 relative to the arms 10.

The upper back wall of the hopper 32 is provided with a secondary bracket 44 which carries a reel 45 mounting a coil of film 27 and the hub of the reel 45 includes a tensioning control operated by an adjustment nut 46. The film 27 unreeling from the reel 45 is threaded over the rollers 28, 29 and 30 and passes downwardly through the secondary delivery tube 26 where it will emerge and be fed onto the layer of the slag, gravel or crushed rock being deposited in the trench cut by the blade 20, the slag, gravel or crushed rock is indicated by the letter "S."

In order that the slag, gravel or crushed rock in the hopper 32 will continuously flow downwardly through the delivery tube 22 when the horizontal valve 34 is open an agitator including a transverse shaft 47 having a plurality of circumferentially spaced radially extending rods 48 thereon is journalled in the opposite side walls of the hopper 32 and a sprocket 49 is positioned on an outer end of the shaft 47 so that a driving chain 50 can be engaged thereon and the shaft 47 rotated thereby. A pair of trailing arms 51 are pivotally secured on the ends of the shaft 47 and carry an axle 52 between their outermost ends upon which a ground engaging pneumatic tired wheel 53 is positioned. A secondary sprocket 54 is positioned on the axle 52 so that it will revolve therewith and the chain 50 is engaged thereon. Thus rotating motion of the pneumatic tired wheel 53 will cause movement of the chain 50 and hence the agitator 48 rotates in the hopper 42. In FIGURE 1 sections of the chain 50 and the trailing arms 51 are broken away so that the details of the bracket 31 and the film 27 may be clearly seen.

In operation, slag, gravel, crushed rocks or the like is positioned in the hopper 32 and a coil 27 of paper, plastic film or the like is positioned on the reel 45 and the same carried downwardly as heretofore described so that it emerges from the bottom of the secondary delivery tube 26 in a position to slide beneath a flat trailing arm 55 which is pivoted to the lower end of the secondary delivery tube 26. A tractor is attached to the tractor hitch 12 on the forward end of the frame 11 which connects with the arms 10 of the device. The colter 18 is adjusted as is the inclination of the blade 20 and the device is pulled through the soil in the position shown. A deep, narrow trench is cut and the gravel, slag, crushed rock or other material in the hopper 32 feeds through the open gate valve 34 and emerges therefrom in the bottom of the trench immediately behind the blade 20 and to a depth determined by the vertical positioning of the secondary delivery tube 20 as heretofore described. The soil being moved aside by the blade 20 is held in open trench relation by the sides of the delivery tubes 22 and 26 and permits the strip of paper or plastic film 27 to emerge from the bottom of the secondary delivery tube 26 and be held in flattened relation by the trailing arm 55 thereby covering the width of the trench and the slag, crushed rock, gravel or the like therein. The earth then falls backwardly into the trench automatically refilling the same.

It will thus be seen that a tractor can tow the device for installing soil drainage means across a field and continuously install the slag, crushed rock, gravel or other material at a depth below that normally plowed and at the same time position the strip of paper or plastic film 27 continuously on the deposited slag, crushed rock or gravels so that the earth falling back into the trench will be prevented from filling the spaces between the particles of slag, gravel or crushed rocks as the case may be. The depth of the trench being cut is determined by the adjustment of the angle of inclination of the blade 20 through the adjustment of the threaded tubular sleeve 43 as heretofore described and the positioning of the colter 18 as will be understood by those skilled in the art.

It will thus be seen that a device for efficiently and inexpensively forming subsoil drainage means has been disclosed and having thus described our invention what we claim is:

1. A device for installing subsoil drainage material comprising an elongated frame having forward and rear ends, connecting means on said forward end of the frame adapted to be connected to a conventional three point hitch of a tractor, a vertically extending blade connected at its central portion by generally horizontally extending pivot means to said rear end of the frame, said blade having a forward sharpened edge extending below the frame and a generally vertically extending rear edge, a hopper mounted on the upper portion of said blade, a rectangular delivery tube communicating with said hopper and having a forward edge connected to the rear edge of said blade so as to form a portion thereof, said rectangular delivery tube being provided with a rearwardly facing opening adjacent the bottom of said blade, a film delivery tube extending generally parallel to said rectangular delivery tube and blade, said film delivery tube having a forward edge connected to the rear edge of said rectangular delivery tube whereby the film delivery tube constitutes a rear portion of said blade, adjustable fastener means connecting said film delivery tube to said rectangular delivery tube in such a manner that the film delivery tube has its lower end adjacent said opening and may be adjusted vertically relative to said rectangular delivery tube whereby the effective size of said opening may be adjusted, a reel adapted to rotatably support a roll of film mounted on said hopper, roller means mounted on said hopper and film delivery tube arranged to feed a continuous length of plastic film from said roll and through said film delivery tube, adjustable connector means connected between the upper portion of said blade and the central portion of said elongated frame whereby said blade may be adjustably pivoted above said pivot means, a colter rotatably mounted on said frame forwardly of and in alignment with said blade between the ends thereof and extending below said frame.

2. A device as defined in claim 1, wherein said adjustable means includes a plurality of threaded bolts, one of said delivery tubes being provided with vertically elongated slots adjacent the other delivery tube, said bolts extending through said slots in one of the tubes and means on the bolts for connecting them to the other delivery tube and preventing axial movement thereof.

References Cited in the file of this patent

UNITED STATES PATENTS

| | | |
|---|---|---|
| 166,104 | Hoffhein | July 27, 1875 |
| 391,225 | Bledsoe | Oct. 16, 1888 |
| 536,340 | Hanneborg | Mar. 26, 1895 |
| 901,220 | Vose | Oct. 13, 1908 |
| 2,713,836 | Ajero | July 26, 1955 |
| 2,739,549 | Taylor | Mar. 27, 1956 |
| 2,749,855 | Giugas | June 12, 1956 |
| 2,764,111 | Collins | Sept. 25, 1956 |
| 2,900,931 | Lisle | Aug. 25, 1959 |

FOREIGN PATENTS

| | | |
|---|---|---|
| 48,844 | Denmark | June 4, 1934 |
| 1,119,312 | France | Apr. 3, 1956 |
| 1,205,861 | France | Oct. 24, 1959 |
| 409,585 | Great Britain | May 3, 1934 |
| 499,453 | Great Britain | Jan. 24, 1939 |
| 532,924 | Great Britain | Feb. 3, 1941 |
| 817,157 | Great Britain | July 22, 1959 |